Dec. 26, 1967 H. SCHILL 3,360,026
MACHINE FOR REMOVING THE RIND FROM BACON OR LIKE MACHINE
HAVING AN ADJUSTABLE BLADE HOLDER AND A FEED ROLL
Filed Feb. 1, 1966 7 Sheets-Sheet 5

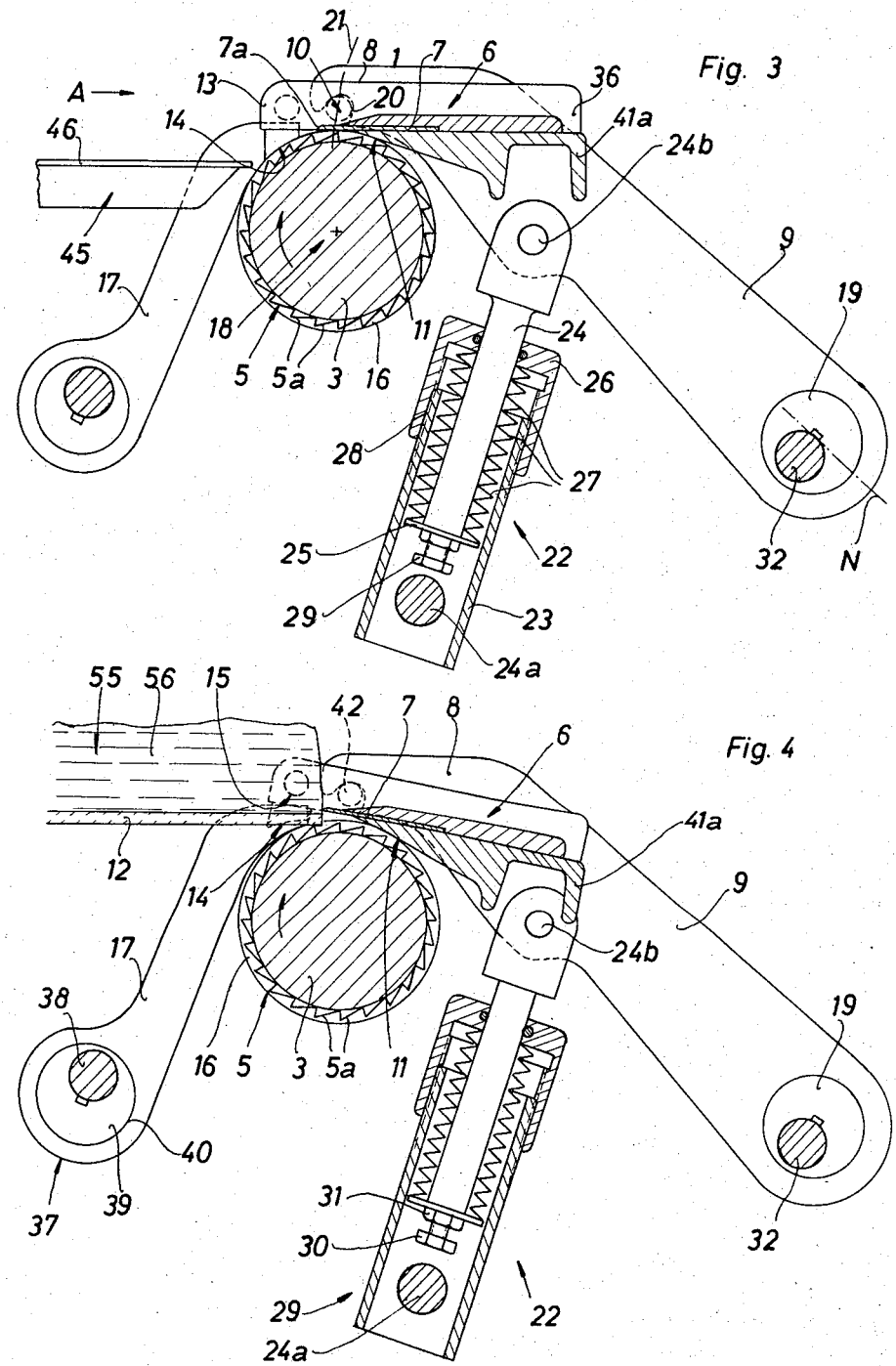

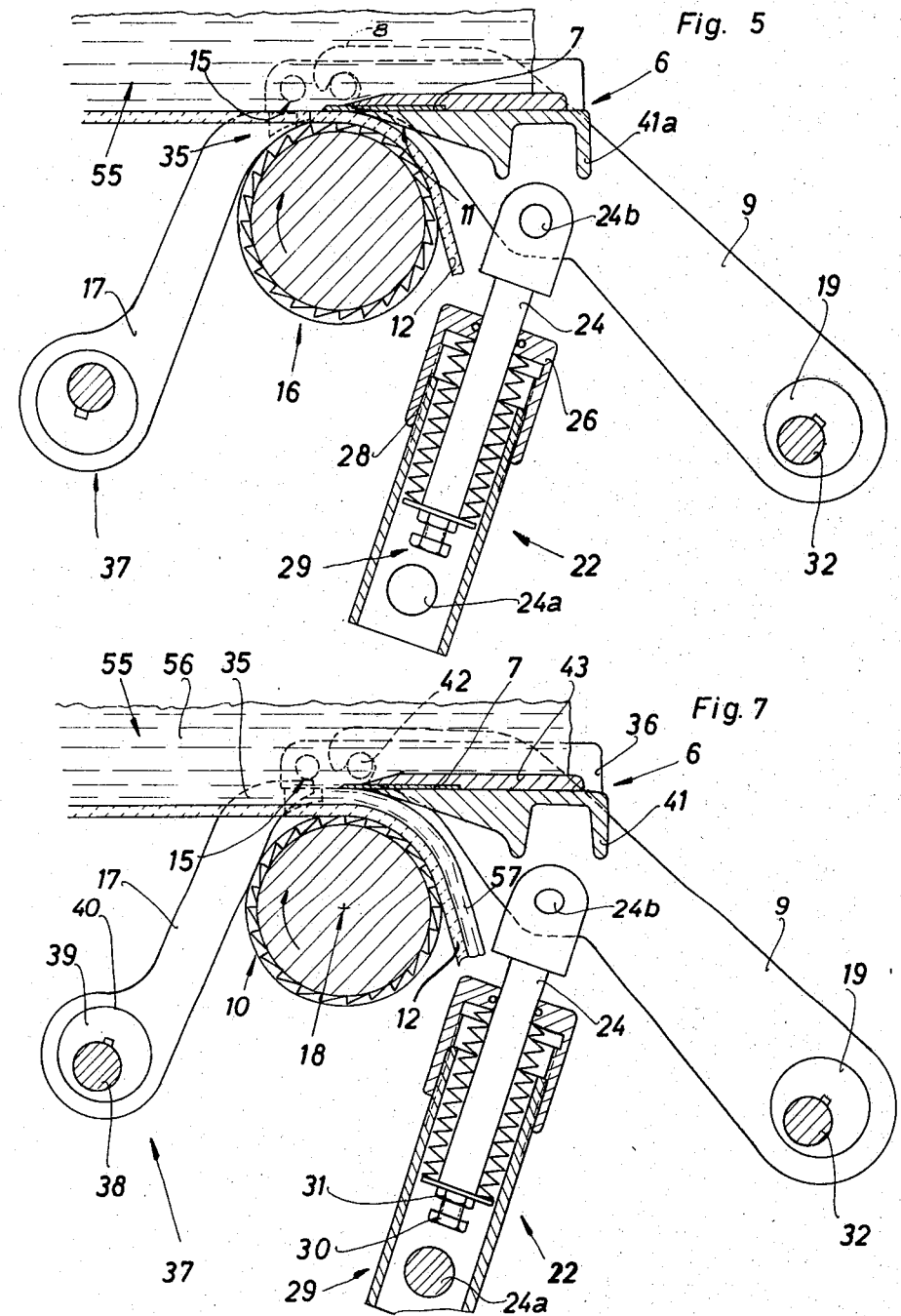

Dec. 26, 1967        H. SCHILL        3,360,026
MACHINE FOR REMOVING THE RIND FROM BACON OR LIKE MACHINE
HAVING AN ADJUSTABLE BLADE HOLDER AND A FEED ROLL
Filed Feb. 1, 1966        7 Sheets-Sheet 6

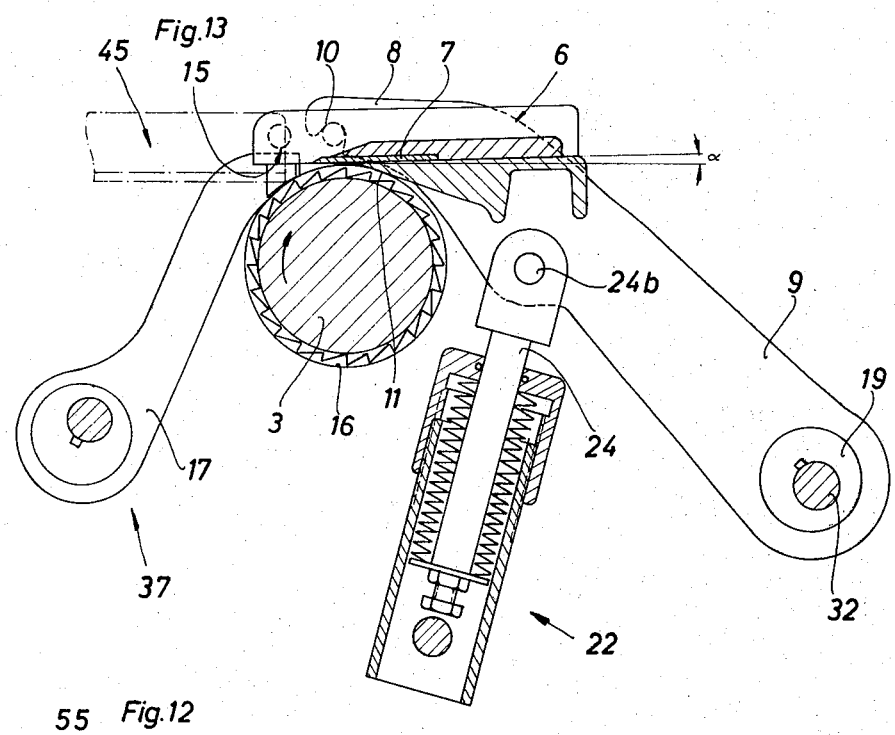
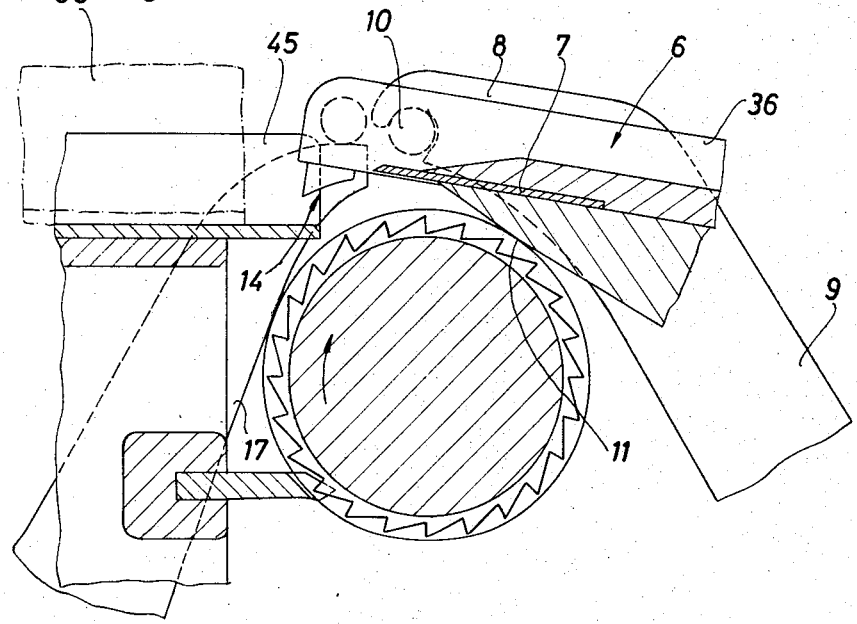

United States Patent Office 3,360,026
Patented Dec. 26, 1967

3,360,026
MACHINE FOR REMOVING THE RIND FROM BACON OR LIKE MACHINE HAVING AN ADJUSTABLE BLADE HOLDER AND A FEED ROLL
Hermann Schill, Goldscheuer, Baden, Germany, assignor to MAJA-Maschinenfabrik Hermann Schill KG, Goldscheuer, Baden, Germany, a firm
Filed Feb. 1, 1966, Ser. No. 524,317
Claims priority, application Germany, Feb. 16, 1965, M 64,157
22 Claims. (Cl. 146—130)

This invention relates to machines for removing the rind from bacon or like machines, and more specifically to a machine of the specified type having an adjustable blade holder and a feed roll.

In such machines for removing the rind from bacon, as a rule, the feed roll is preceded by a feed table on which the material from which the rind is to be removed is fed to the feed roll and the blade. In the hitherto known machines for removing the rind from bacon the operation of the machine is unsatisfactory inasmuch as on the one hand the commencement of the cutting operation and on the other hand the clean removal of the rind or the cutting of the bacon or the like into thin slices is relatively difficult. In order to facilitate the commencement of the cutting operation, machines for removing the rind from bacon or like machines have already been suggested in which the blade, for commencing the cutting operation, can be raised by means of a special lifting device, e.g. by a foot pedal. This device has, however, the disadvantage that it is left to the operator's discretion when the blade is to be lowered. By a belated lowering of the blade part of the valuable bacon may be lost. Furthermore, such a machine for removing the rind from bacon is not suitable for automatic control because an operator is always required.

It is, therefore, the object of the present invention to provide a machine for removing the rind from bacon or like machine in which the above-mentioned disadvantages are avoided. In particular, the blade is to adjust itself automatically into a predetermined position in which the cutting operation is commenced and into a predetermined operating position. Furthermore, the blade holder should be easily removable and the feed roll readily accessible to permit easy cleaning of these parts. Moreover, in the machine for removing the rind from bacon it should be possible to bring the blade holder into a position in which during the advance of the material from which the rind is to be removed sharp deflections of the material are avoided. This is important, for example, in the case of older bacon the rind of which is already brittle so that the rind may not tear off during its removal.

This object is achieved according to the invention by providing a machine for removing the rind from bacon or like machine, which comprises a feed roll, an adjustable blade holder constructed as a rocker, adjusting means acted upon by displacement force and having a swingable end for mounting said blade holder thereon, a blade on said blade holder having its cutting edge situated substantially below the pivot of said rocker-like blade holder, a feed table, stop faces provided on the portion of said rocker-like blade holder facing said feed table, said stop faces serving for fixing the cutting edge of said blade in its foremost lower position, and bearing members on said machine serving to support said stop faces.

The adjusting means may be a pair of lever arms, and the bearing members may be at least one bearing surface and at least one adjusting lever.

By this arrangement in which the pivot of the rocker-like blade holder is situated above the cutting edge of the blade, it is achieved that the advancing material from which the rind is to be removed seeks to tilt the blade holder and thus the cutting edge of the blade downwardly. This tilting movement is limited by the stop faces coming into contact with bearing surfaces.

A supporting surface may be provided on the portion of the rocker-like blade holder remote from the feed table, which supporting surface is adapted to be supported on at least one bearing surface on the machine or on the bacon rind or the like. This feature of the rocker-like blade holder is particularly advantageous for bringing the blade into the position in which the cutting operation is commenced. When the portion of the blade holder facing the feed table is raised by the adjusting lever, the portion of the rocker-like blade holder remote from the feed table can bear with its supporting surface against the machine so that the blade is brought into a position suitable for commencing the cutting operation.

Also the other following features of the machine as proposed by the invention can co-operate individually or in groups in combination with the rocker-like blade holder and its holding and setting mechanisms. The bearing surfaces for the supporting surface and for the stop faces on the blade holder may preferably be annular surfaces formed on the feed roll preferably in the vicinity of the bearings for the feed roll. Thereby the bearing surfaces are obtained with very simple means requiring nearly no additional space.

The pivot of the rocker-like blade holder is expendiently situated substantially in the middle between the supporting surface on the one hand and the stop faces on the other hand, the force exerted by the lever arm on the blade holder being preferably directed substantially to the centre of the feed roll. It has been found that with this geometric arrangement a favourable play of forces is obtained for controlling the position of the blade.

The pair of lever arms is advantageously acted upon by means of at least one spring having an adjustable pretension and producing the displacement force. Since springs produce a restoring force increasing with the deflection of the pair of lever arms, they are particularly suitable for obtaining the play of forces on the rocker-like blade holder. The spring is expediently constituted by at least one spring assembly which is provided with a pull rod pivoted to the pair of lever arms and which has an adjustable stop member for the pull rod in the stress-relieving direction. The pair of lever arms are expediently mounted by means of an eccentric shaft or the like in an upright of the machine so as to be adjustable relative to the axis of the feed roll.

It is advantageous to provide the machine for removing the rind from bacon with a feed table which is preferably adapted to be swung down forwardly and the top side of which is situated in the operating position slightly below the upper apex line of the feed roll.

If desired, the feed table may carry in a known manner a stripping plate which engages with teeth in annular grooves in the feed roll.

The adjusting lever or levers for the blade holder are expediently mounted by means of an eccentric shaft or the like in the upright of the machine so that they are settable.

For removing the rind from fresh bacon a substantially horizontal position of the blade is advantageous. Therefore, the invention suggests that in the normal positions of the pair of lever arms the blade should be in its initial position and during the rind-removing operation it should be situated substantially above the apex line of the feed roll as well as substantially in a horizontal position.

To be able to easily remove the blade holder, the swingable ends of the pair of lever arms are swingable slightly out of the region of the feed roll and bearing eyes are formed in the swingable ends of the pair of lever arms, which bearing eyes are open toward the feed roll.

Between the normal positions of the pair of lever arms and the aforementioned lifting position for the blade holder intermediate positions may be provided which may have locking locations and in which the blade assumes forwardly and downwardly inclined positions. In this position of the blade holder the advancing material from which the rind is to be removed is required to perform only a slight deflection when it passes from the feed table to the top side of the blade holder. This is desirable above all when removing the rind from bacon or the like that has been stored for some time and that is already somewhat tougher and has a more brittle rind.

In a particular embodiment of the invention respecting the lifting mechanism for the blade holder, the position of the stop member of the spring assembly and the position of the eccentric shaft for the pair of lever arms are adjusted to one another in the region of the lifting position in such a manner that when turning the eccentric shaft toward the lifting position, the pull rod first reaches its abutment whereupon its pivot on the pair of lever arms forms the fulcrum of the lever arms so that when further turning the lower ends of the pair of lever arms into the lifting position, the upper swingable ends of the pair of lever arms move somewhat out of the region of the feed roll.

It is favourable when the blade holder has two clamping jaws for holding the blade.

The fulcrum of the pair of lever arms on the upright of the machine is expediently located behind and preferably also below the feed roll. This position of the fulcrum as well as the eccentric mounting of the pair of lever arms influences the adjusting movement of the pivot of the rocker-like blade holder when the pair of lever arms co-operate with the stop member on the spring assembly for the purpose of adjusting the lifting position.

One embodiment of the invention will now be described by way of example and with reference to the accompanying drawings, in which:

FIG. 3 is a vertical section, on an enlarged scale, through the blade holder, the feed roll and the spring assembly with one lever of the pair of lever arms and one adjusting lever shown in elevation and the remaining parts of the machine omitted for the sake of clarity, the blade holder being in its initial position in the normal positions of the pair of lever arms;

FIG. 4 is a view similar to FIG. 3, but showing the blade holder in the position in which the cutting operation for removing the bacon rind is commenced;

FIG. 5 is a view similar to FIG. 3, illustrating the removal of the bacon rind;

FIG. 7 is a view similar to FIG. 3, illustrating the removal of the bacon rind with a certain bacon layer remaining on the bacon rind;

FIG. 12 is a view similar to FIG. 6, but showing the blade holder in the position in which the cutting operation for removing the bacon rind with a bacon layer remaining on the bacon rind is commenced, and FIG. 13 is a view similar to FIG. 3, but showing the pair of lever arms and the blade holder in an intermediate position in which the blade assumes a forwardly and downwardly inclined position.

Figures 1, 11:
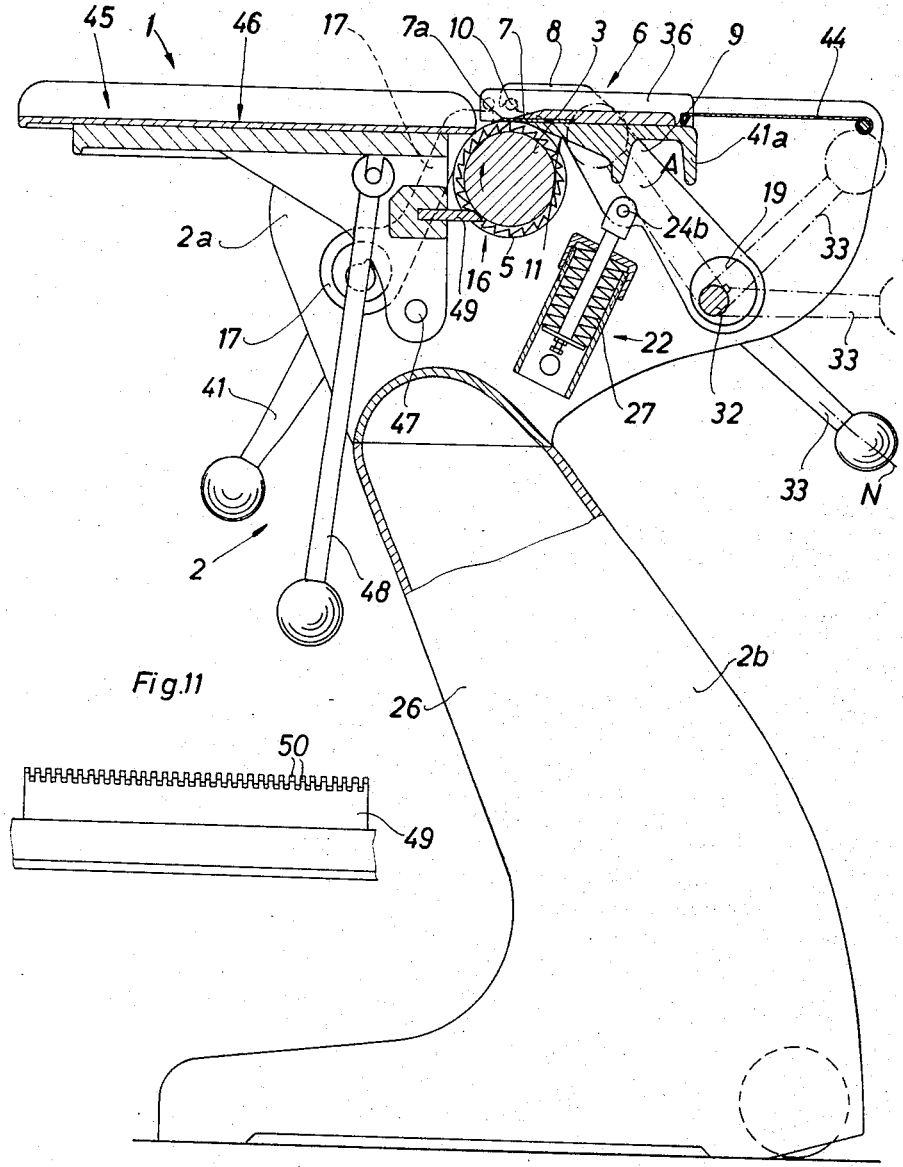
FIG. 1 is a side elevational view, partly in section on the line I—I of FIG. 2, of a machine for removing the rind from bacon according to the invention.
FIG. 11 is a fragmentary elevational view of a stripping plate.

With reference now to the drawings, a machine for removing the rind from bacon according to the invention, which is designated generally by the numeral 1, includes an upright 2 comprising an upper part 2a and a lower part 2b. Located in the upper part 2a of the upright 2 of the machine is a feed roll 3 which is rotatably mounted in the upright 2 by means of pivot pins 4 and the central portion of which is equipped in a known manner with toothed rims 5. The teeth 5a of the toothed rims 5 are preferably of saw-tooth shape in cross section and adapted to engage the material from which the rind is to be removed in the region behind the feed table and in front of the blade for slicing off the rind from the material and to feed the material to the said blade. Located above the feed roll 3 is a blade holder designated generally by the numeral 6 and carrying a blade 7 for slicing off the rind from the material. It is to be noted that the machine 1 may also be used for skinning fish or cutting slices of meat, rashers of bacon or the like.

According to an important feature of the invention the blade holder 6 is constructed as a rocker and mounted on the ends 8 of a pair of spring-loaded lever arms 9. In this arrangement the cutting edge 7a of the blade 7 is positioned substantially below the pivot 10 of the blade holder 6 constructed as a rocker. Furthermore, for controlling the position of the blade, a supporting surface 11 is provided on the rearward portion of the rocker-like blade holder 6 for engagement with at least one bearing surface on the machine for removing the rind from bacon or the like or with the bacon rind 12 or the like. Moreover, stop faces 14 and 15 are provided on the front portion 13 of the rocker-like blade holder 6.

The bearing surfaces for the supporting surface 11 and for the stop faces 14 and 15 of the blade holder 6 are constituted by known annular surfaces 16 formed on the feed roll 3, which annular surfaces will be called hereinafter annular bearing surfaces 16. These latter surfaces are arranged laterally adjacent the central portion of the feed roll 3 equipped with the toothed rims 5 in the vicinity of the pivot pins 4 of the feed roll. Furthermore, the machine 1 for removing the rind from bacon or the like is provided with an adjusting lever 17 against which the stop face 15 of the blade holder 6 can bear (see particularly FIGS. 1, 3, 4, 9 and 10). The blade holder 6 is dimensioned so that its pivot 10 is positioned substantially in the middle between the rearward supporting surface 11 on the one hand and the stop faces 14 and 15 formed on the front portion of the blade holder 6 on the other hand. Thereby and by the shape and disposition of the pair of lever arms 9 it is achieved that the force exerted by the pair of lever arms on the blade holder 6 is directed substantially to the centre of the feed roll, The two levers of the pair of lever arms 9 are mounted on eccentrics 19 located behind and below the feed roll 3, and the swingable ends 8 of the pair of lever arms 9 are slightly bent forwardly so that they extend substantially horizontally. Bearing eyes 20 in the pair of lever arms 9 can therefore move on a substantially vertically oriented, slightly rearwardly and upwardly receding radius line 21 having its centre in the centre of the eccentric 19 (see FIG. 3).

The pair of lever arms 9 are acted upon by a spring which pulls the pair of lever arms toward the feed roll 3 so that the rocker-like blade holder 6, if no material from which the rind is to be removed is available there, bears, e.g., with its stop face 14 and with its supporting surface 11 against the annular bearing surfaces 16 of the feed roll 3 in front of and behind the upper apex line of the feed roll (see, e.g., FIG. 3).

As adjustable springs two spring assemblies designated generally by the numeral 22 are provided. Each spring assembly has a guide sleeve 23 which is mounted by means of a bolt 24a so as to be slewable in a vertical plane. The guide sleeve 23 has a pull rod 24 extending therethrough which is pivoted by means of a bolt 24b to one arm of the pair of lever arms 9. Arranged between a plate 25 which is disposed at the lower end of the pull rod 24 and an adjusting head 26 which covers the guide sleeve 23 at the top thereof are a plurality of cup springs 27. By turning the adjusting head 26 which is connected to the guide sleeve 23 by means of a thread 28, the pretension of the cup springs 27 and thus the displacement force of the spring assembly 22 can be adjusted.

At the lower end of the pull rod 24 there is provided an adjustable stop member designated generally by the numeral 29. This stop member consists of a screw 30 securable by means of a nut 31, which screw is screwed into the bottom side of the pull rod 24 and can bear against the bolt 24a.

The pair of lever arms 9 of which in FIGS. 1, 3 to 8, 12 and 13 only one lever arm is shown are mounted in the upright 2 of the machine by means of an eccentric shaft 32. The eccentric shaft 32 carries two eccentrics 19 which are non-rotatably connected thereto and serve as a support for the rearward lower ends of the pair of lever arms 9. The eccentric shaft 32 projects with one end laterally from the upright 2 of the machine and carries an adjusting lever 33 at this end (see particularly FIG. 1). By swinging this lever the eccentrics 19 serving as supporting points for the rear lower ends of the pair of lever arms 9 can be adjusted relative to the axis 18 of the feed roll.

The lowermost and foremost position of the blade holder 6 is determined either by the stop faces 14 co-operating with the annular bearing surfaces 16 or by the adjusting lever 17. The adjusting lever or levers 17 engage with noses 35 under the stop faces 15 formed by bolt-like members arranged on lateral sides 36 of the blade holder 6. At its lower end each adjusting lever 17 has a setting mechanism designated generally by the numeral 37 and corresponding to the setting mechanism for the pair of lever arms 9. Also in this case one eccentric 39 is provided for each adjusting lever 17, which eccentric is keyed to an eccentric shaft 38 rotatably mounted in the upright 2 of the machine, and embraced by a bearing eye 40 in the adjusting lever. The eccentric shaft 38 projects with one end laterally from the upright 2 of the machine and carries an adjusting lever 41 for turning the eccentric shaft and for moving the nose 35 of the adjusting lever 17 up and down. The swingable upper portion of the adjusting lever can bear against the annular bearing surface 16 and is thus given the necessary guidance.

The blade holder substantially consists of a base portion 41a which has in the region of the annular bearing surfaces 16 the lateral sides 36 to which bearing bolts 42 are affixed by means of which the rocker-like blade holder 6 is held in the bearing eyes 20 in the pair of lever arms 9. The blade holder 6 further includes a fixing plate 43 for the blade 7. In the embodiment shown in the drawings the base portion 41 of the blade holder and the fixing plate 43 are constructed as clamping jaws for holding an exchangeable and relatively thin blade.

At its rear end the blade holder carries one end of a sheet-metal plate 44 which forms, together with the top side of the blade holder, a surface for carrying the material from which the rind has been removed.

As seen in the direction of feeding the material from which the rind is to be removed, a feed table 45 is located in front of the feed roll 3, the top side 46 of the feed table being situated in its working position in a known manner slightly below the upper apex line of the feed roll. The feed table can, as is also known, be swung down forwardly. For this purpose it is mounted for rotation about a bolt 47 and can be held in working position by means of a locking lever 48. The feed table 45 carries a stripping plate 49 (FIGS. 1 and 11) which engages with teeth 50 in grooves 51 located between the toothed rims 5 of the feed roll. On the one hand, the ease of removing the blade holder 6 and the sheet-metal plate 44 and the possibility of swinging down the feed table 45 ensure easy cleaning of these parts and ready access to the feed roll and the entire upper part of the machine. On the other hand, the disposition of the sheet-metal plate 44 permits a great mobility of the blade holder 6, while the surface for carrying the material from which the rind has been removed is retained.

The machine proposed by the invention for removing the rind from bacon or the skin from fish and the like can operate as follows:

The blade holder 6 should be first in an initial position as shown in FIGS. 1 and 3. Accordingly, the adjusting lever 33 is in the position shown in FIG. 1 in full lines, which position is called the normal adjustment and designated by the reference character N. As can be seen from FIGS. 1 and 3, the top side 46 of the feed table 45 terminates slightly in front of and below the feed roll 3. Between the edge of the top side 46 adjacent the feed roll 3 and the cutting edge 7a of the blade 7 the teeth 5a of the toothed rims 5 are freely exposed so that they can easily grip the material from which the rind is to be cut and move it forward in the feed direction which in FIGS. 1 and 3 extends from the left to the right. Before the material 55 from which the rind is to be removed contacts the blade 7, the blade holder 6 assumes a substantially horizontal position as shown in FIGS. 1 and 3. This position is determined by the position of the bearing eyes 20 in the pair of lever arms 9 and by the disposition of the supporting surface 11, the stop faces 14 and the annular bearing surfaces 16 serving as contact surfaces therefor. FIG. 3 shows the feed table 45 with its end directed to the feed roll 3, whereas in various other figures the feed table has been omitted for the sake of clarity. During the commencement of the cutting operation the material from which the rind is to be removed and which, in the embodiment shown in the drawings, consists of a piece of bacon 55 can first slightly press during its advance the blade holder back in the feed direction as shown in FIG. 4. As a result, the pair of lever arms 9 are swung slightly to the right against the pull exerted by the spring assembly 22 so that the blade holder 6 bears with its supporting surface 11 in a somewhat lower position against the annular bearing surface 16 and the cutting edge 7a of the blade 7 is slightly raised. Thereby the cutting edge 7a gets out of the region of the hard bacon rind 12 into the region of the bacon layer 56 easier to cut. Furthermore, due to the inclined position of the blade 7 during the commencement of the cutting operation as shown in FIG. 4, the bacon rind 12 to be sliced off is diverted by the blade 7 toward the teeth 5a of the feed roll 3. When the material from which the rind is to be removed has been passed on a certain distance, as shown in FIG. 5, the bacon rind 12 sliced off has passed through the channel formed between the supporting surface 11 and the surface of the feed roll, and thereby turned the blade holder 6 mounted in rocker fashion out of the position shown in FIG. 4 in which the cutting operation is commenced into the position shown in FIG. 5 in which the rind is sliced off from the bacon.

During the commencement of the cutting operation the following is utilized for controlling the blade 7 and the blade holder 6:

The harder tougher bacon rind 12 opposes to the penetration of the blade 7 a substantially greater resistance than the bacon layer 56 does. By appropriately adjusting the elastic force of the spring assembly 22, the pair of lever arms 9 can move to the right until the cutting edge 7a of the blade 7 is swung to a level sufficient to permit its penetration into the bacon layer 56. Then the force occurring during the advance of the bacon layer 56 to the blade 6 is no longer so great that it could effect a further deflection of the blade holder 6 and of the pair of lever arms 9 against the action of the spring assembly 22. Thus, for controlling the position of the blade, use is made of the differing resistances which are opposed by the bacon rind 12 and the bacon layer 56 to the penetration of the blade 7.

The above-described motional conditions on the blade holder 6, which are dependent on the resistance encountered by the blade 7 when penetrating the material from which the rind is to be removed, are also utilized in an advantageous manner for the further rind-removing operation wherein the resistance encountered by the blade when penetrating the material seeks to tilt the blade toward the rind 12 and the relatively tough bacon layer already brakes a too great tilting movement of the blade if occasion arises before the blade holder 6 has reached its front stop position. If the rind 12 has thickened portions, which is practically frequently the case, the blade 7 because of its rocker-like mounting and the swingability of the pair of lever arms 9 can deflect also during the removal of the rind as shown in FIG. 5 slightly upwardly and/or in the direction of feeding the material 55 from which the rind is to be removed. In this case the gap between the underside of the blade 7 and the surface of the feed roll 3 becomes slightly larger. This, however, does not result in that a thickened portion of the bacon rind involves a continuous enlargement of the thickness of the rind which is being sliced off. Apart from the already mentioned tilting effect which is exerted on the cutting edge of the blade by the advancing material from which the rind is to be removed, and which seeks to tilt the cutting edge toward the rind, also the above-mentioned thickened portion of the rind sliced off causes in the region of the supporting surface 11 the portion of the blade holder remote from the feed table to be tilted upwardly. This also causes the cutting edge 7a of the blade to be first again swung toward the bacon rind 12 until the position of the blade desired for the removal of the rind balances out there.

If it is desired to remove the rind from bacon with a certain bacon layer remaining on the rind, the machine 1 operates as follows:

The lowermost and foremost position of the blade holder 6 is no longer determined by the co-operation of the stop faces 14 with the bearing surfaces 16 but by at least one settable adjusting lever 17 which engages with its nose 35 under at least one stop face 15 of the blade holder 6. FIG. 12 shows the corresponding initial position of the blade holder 6 which is at the same time the position in which the cutting operation is commenced. The blade 7 can cut into the bacon layer 56 in the desired manner slightly above the bacon rind 12 so that a certain layer 57 of the bacon is additionally sliced off together with the bacon rind 12. This is sometimes desirable for the further treatment of the bacon rind. Even if the machine 1 is to slice off the rind from bacon together with a layer of the bacon, the underside of the blade 7 which in the position in which the cutting operation is commenced is inclined from top left to bottom right will divert the severed rind provided with the bacon layer 57 to the teeth 5 of the feed roll. On the other hand, this severed layer consisting of the rind 12 and the bacon layer 57 will raise the portion of the blade holder 6 remote from the feed table 45 into a substantially horizontal position. This is the actual working position which adjusts itself after the commencement of the cutting operation (see FIG. 7).

It is once more to be specially mentioned that the pressing of the rind 12 or another layer to be severed into the teeth 5a of the feed roll 3 during the commencement of the cutting operation, is effected by the blade assuming a particular position (FIGS. 4 and 12) and that subsequently during the removal of the rind or the cutting of the material into slices the control of the position of the blade is effected by the rind 12 or any other similar layer to be severed. A special pressure shoe which presses the severed rind 12 or the like against the feed roll 3 and which must have for this purpose an underside designed to extend approximately parallel to the curvature of the roll is not required, since due to the rocker-like construction of the blade holder 6 the blade holder or the blade 7 "floats" in the material from which the rind is to be removed.

The foremost lower cutting position is determined by the adjusting lever 17 or the annular bearing surfaces 16 with the advancing material from which the rind is to be removed seeking to tilt the cutting edge 7a of the blade downwardly toward the rind. Furthermore, the position of the blade 7 is controlled, by means of the portion of the blade holder remote from the feed table and situated behind the pivot of the rocker-like blade holder, by the material from which the rind is to be removed and which moves both past the top side of the blade holder and past the supporting surface 11 pertaining to the blade holder. During this action, as is highly desirable, a portion of the supporting surface 11 can urge the rind 12 or the like passing the supporting surface against the feed roll 3 or keep it in the vicinity thereof. The blades 7 may be, however, flat blades having a smooth underside, e.g. blades which are manufactured from extremely thin hard steel and need not be reground but are intended to be used but once.

Figure 8:
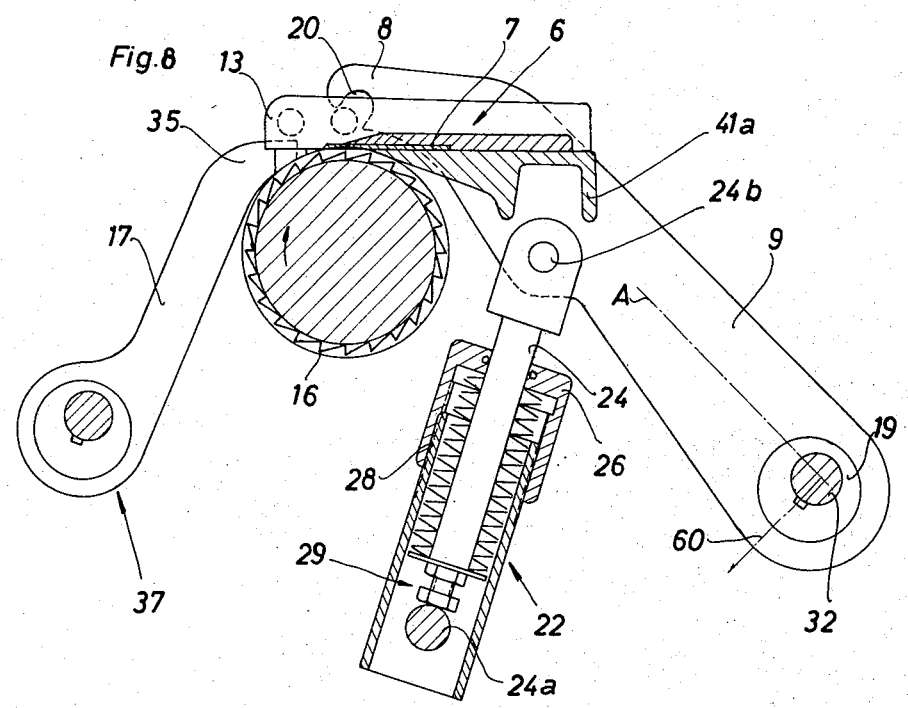
FIG. 8 is a view similar to FIG. 3, but showing the pair of lever arms in the lifting position for the blade holder.
Figure 6:
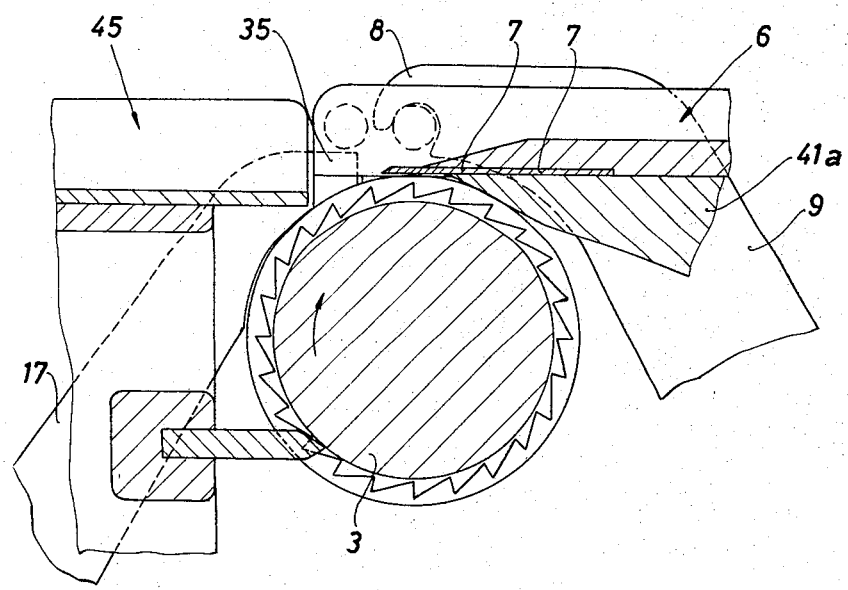
FIG. 6 is a fragmentary sectional view, on an enlarged scale, of the machine of FIG. 3.
Figure 9:
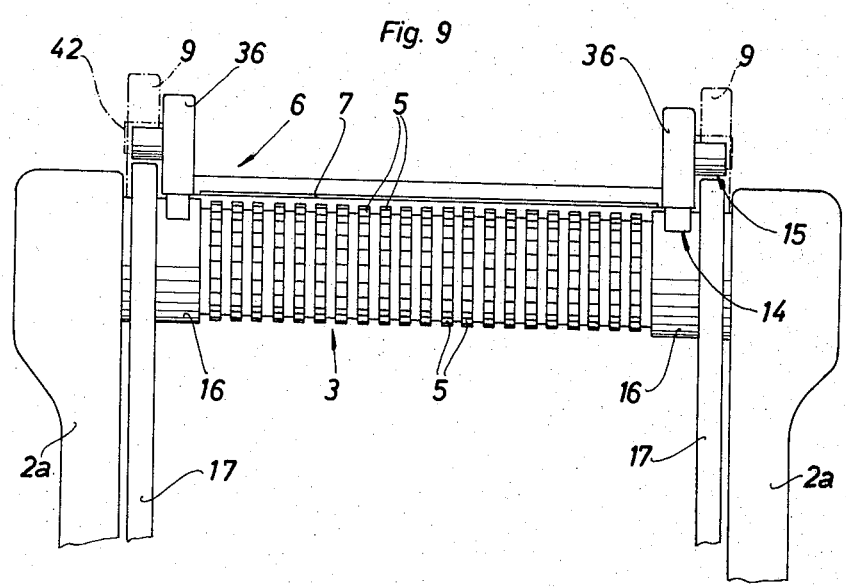
FIG. 9 is a front elevational view of the feed roll as seen in the direction of arrow A of FIG. 3, with the blade holder shown in the position represented in FIG. 3.
Figure 10:
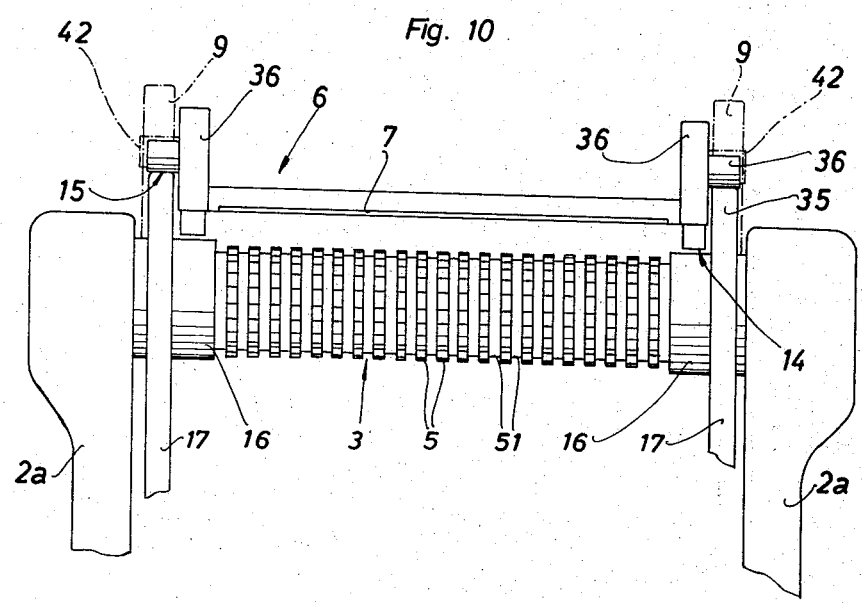
FIG. 10 is a view similar to FIG. 9, but showing the blade holder as raised in its front portion by means of the adjusting levers for the purpose of removing the bacon rind with a bacon layer remaining on the bacon rind.

For withdrawing the blade holder 6 the pair of lever arms 9 are required to assume a special position as determined by the position of the eccentric 19 and the associated adjusting lever 33 shown in FIG. 8. The adjusting lever 33 has been turned by about 90 degrees from its normal position N (FIG. 1) into the position designated by the reference character A (FIG. 8), so that the fulcrum of the rear end of each lever arm of the pair of lever arms 9 has shifted in the direction of arrow 60. Since the positions of the swingable upper ends 8 of the pair of lever arms 9 are determined by the annular bearing surfaces 16 through the intermediary of the blade holder 6, the pull rod 24 during the turning of the adjusting lever 33 from the position N into the position A is fixed in its lower end position by means of its stop member 29. When further turning the adjusting lever 33 into the lifting position A, the pivot bolt 24b then acts as a fulcrum for the pair of lever arms 9 with the result that the swingable upper ends of the pair of lever arms are lifted, as shown in FIG. 8. As the bearing eyes 20 provided in the upper end of the pair of lever arms for holding the blade holder 6 are then open substantially in the direction of the tangent line to the feed roll, the blade holder 6 can be withdrawn in this position of the pair of lever arms 9 when it is moved toward the feed table 45.

Between the normal adjustment of the pair of lever arms determined by the position N of the adjusting lever 33 (FIG. 1) and the lifting position A according to FIG.

8 special intermediate positions of the lever 33 are provided for the position of the blade holder. If desired, such positions of the lever 33 which are indicated in dot and dash lines in FIG. 1 and in which the blade holder 6 assumes a particular position can be used for special rind-removing operations. For adjusting these particular positions the adjusting lever 33 can operate in a self-locking manner so that a predetermined region is continuously available. It is also possible to provide in the usual manner definite stop locations for these particular positions. Such an adjustment of the blade holder is shown in FIG. 13 where the blade holder is inclined downwardly and toward the feed table 45 through an angle α. Hence it follows that the passage from the top side of the feed table over the freely exposed portion of the surface of the feed roll to the top side of the blade or the blade holder 6 in the direction of feeding the material 55 from which the rind is to be removed takes place without sharp curves or bends. Accordingly, in this position of the blade holder the material from which the rind is to be removed need not perform heavy deflections during the rind-removing operation. This is of particular advantage when the bacon from which the rind is to be removed has already been stored for some time and is therefore somewhat tougher and its rind somewhat more brittle. In the case of such a state of the material from which the rind is to be removed there is in the normal operating position of the blade holder the risk of the bacon not being capable of following sufficiently easily the contour of the surface carrying it, but exerting undesirable forces acting transversely to the bacon rind 12. The rind may then, especially if it is somewhat brittle, be easily unintentionally cut through by the blade so that no complete removal of the rind is effected when the material from which the rind is to be removed passes through the machine 1. This disadvantage can be largely avoided by appropriately adjusting the blade holder 6. As, when swinging the blade holder toward the feed table 45, the cutting edge of the blade covers to a great extent the open portion of the surface of the feed roll equipped with the teeth 5a, the commencement of the cutting operation is rendered somewhat difficult in this position. Therefore, various intermediate positions or a range of adjustment are provided, so that for different conditions of the bacon in each case the optimum position of the blade holder 6 can be adjusted.

Figure 2:
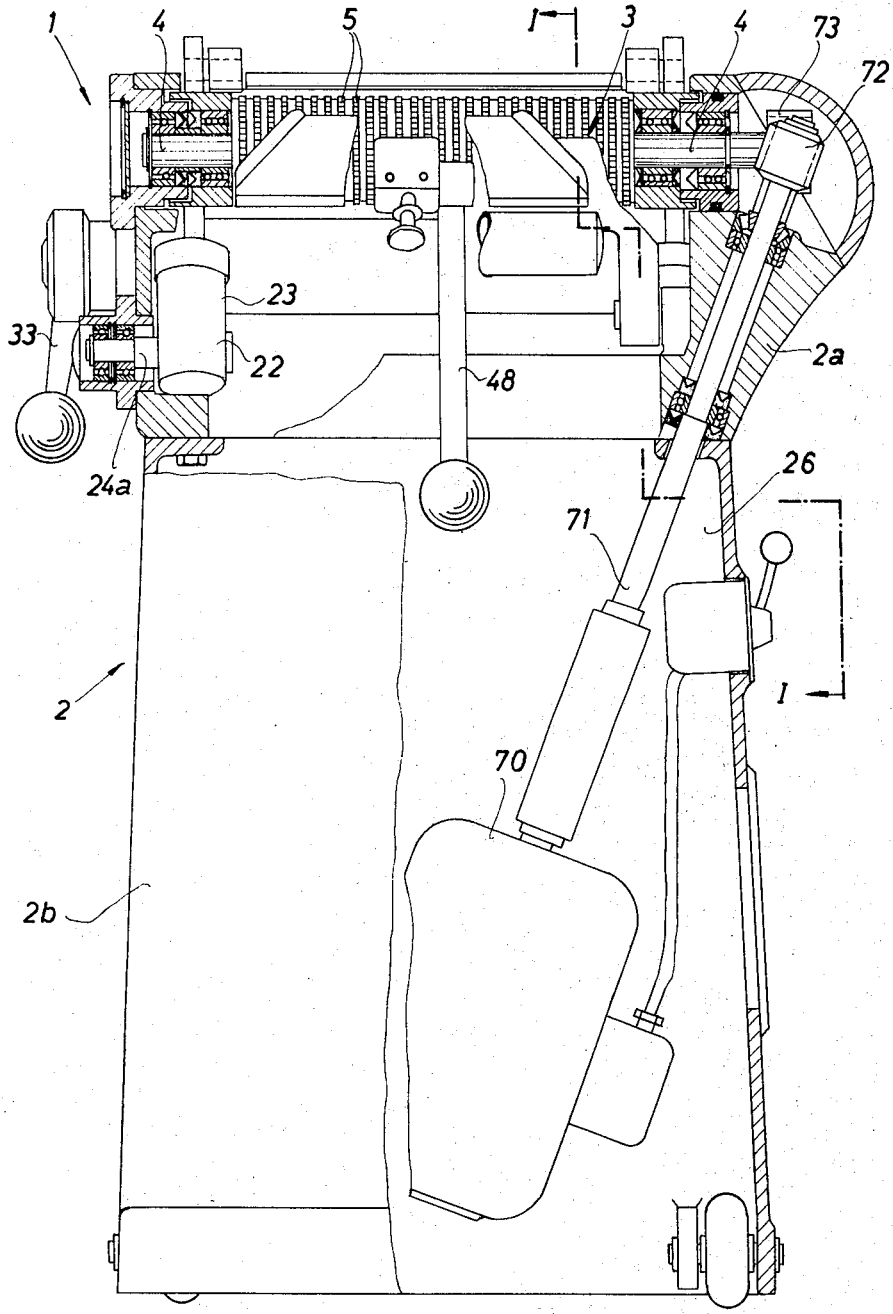
FIG. 2 is a front elevational view, partly in section, of the machine for removing the rind from bacon, the section being taken through the bearings of the feed roll, the drive for the feed roll and the pivot pin of the spring assembly, and parts of the feed table and its environs being omitted.

FIG. 2 shows the drive for the feed roll 3 which does not belong to the present invention. A motor 70 is connected by means of a shaft 71 and a pair of toothed wheels 72 and 73 to the pivot pin of the feed roll 3 which is extended in this place.

Of course, the features of the present application can act in the sense of the invention not only in a combination grouped in accordance with the present main claim but also in other combinations. Thus, for example, individual features of the claims 4, 5, 7, 10 16, 20 and 21 can act in combination with the features of claim 1. The same applies to individual features of the claims 1, 11, 16 and 17.

I claim:

1. A machine for removing the rind from bacon or like machine, comprising a feed roll, an adjustable blade holder constructed as a rocker, adjusting means acted upon by displacement force and having a swingable end for mounting said blade holder thereon, a blade on said blade holder having its cutting edge situated substantially below the pivot of said rocker-like blade holder, a feed table, stop faces provided on the portion of said rocker-like blade holder facing said feed table, said stop faces serving for fixing the cutting edge of said blade in its foremost lower position, and bearing members on said machine serving to support said stop faces.

2. A machine as claimed in claim 1, wherein the adjusting means comprise a pair of lever arms.

3. A machine as claimed in claim 1, wherein the bearing members comprise at least one bearing surface and at least one adjusting lever.

4. A machine as claimed in claim 3, wherein a supporting surface is provided on the portion of the rocker-like blade holder remote from the feed table, and adapted to be supported on at least one bearing surface on the machine or on the rind or the like.

5. A machine as claimed in claim 4, wherein annular surfaces formed on the feed roll serve as bearing surfaces for the supporting surface and the stop faces on the blade holder.

6. A machine as claimed in claim 5, wherein the annular surfaces are formed on the feed roll in the vicinity of the bearings of the feed roll.

7. A machine as claimed in claim 6, wherein the pivot of the rocker-like blade holder is situated substantially in the middle between the supporting surface on the one hand and the stop faces on the other hand and the force exerted by the adjusting means on the blade holder is directed substantially to the centre of the feed roll.

8. A machine as claimed in claim 2, wherein at least one spring is arranged to act on the pair of lever arms.

9. A machine as claimed in claim 8, wherein the spring is adjustable.

10. A machine as claimed in claim 9, wherein the spring is constituted by at least one spring assembly, a pull rod is provided on the spring assembly and pivoted to the pair of lever arms and an adjustable stop member is provided on the spring assembly in the stress-relieving direction.

11. A machine as claimed in claim 10, wherein the machine includes an upright and an eccentric shaft mounts the pair of lever arms in the upright of the machine so that they are adjustable relative to the axis of the feed roll.

12. A machine as claimed in claim 11, wherein the machine has a feed table the top side of which is situated in the operating position slightly below the upper apex line of the feed roll.

13. A machine as claimed in claim 12, wherein the feed table is arranged to be swung down forwardly.

14. A machine as claimed in claim 13, wherein a stripping plate is carried in a known manner on the feed table.

15. A machine as claimed in claim 3, wherein the machine includes an upright and an eccentric shaft mounts the adjusting lever for the blade holder in the upright of the machine so that it is settable.

16. A machine as claimed in claim 14, wherein in the normal position of the pair of lever arms the blade is in its initial position and during the rind-removing operation it is situated substantially above the upper apex line of the feed roll as well as substantially in a horizontal position.

17. A machine as claimed in claim 16, wherein the swingable ends of the pair of lever arms are swingable out of the region of the feed roll and bearing eyes are formed in the swingable ends of the pair of lever arms, which bearing eyes are open toward the feed roll so that in this position of the ends of the pair of lever arms the blade holder can be withdrawn from the pair of lever arms.

18. A machine as claimed in claim 17, wherein between the normal positions of the pair of lever arms and the lifting positions thereof intermediate positions are provided in which the blade assumes positions which are inclined downwardly toward the feed table and in which the material from which the rind is to be removed undergoes only a slight deflection when it passes from the feed table to the top side of the blade holder.

19. A machine as claimed in claim 11, wherein the position of the stop member of the spring assembly and the position of the eccentric shaft for the pair of lever arms are adjusted to one another in the region of the lifting position in such a manner that when turning the eccentric shaft toward the lifting position, the pull rod first assumes its lower stop position whereupon its pivot on the pair of lever arms forms the fulcrum of the pair of lever arms so that when further turning the lower ends of the pair of lever arms resting on the eccentrics into the lifting position, the upper ends of the pair of lever arms move somewhat out of the region of the feed roll.

20. A machine as claimed in claim 1, wherein the blade holder includes two clamping jaws for holding the blade.

21. A machine as claimed in claim 19, wherein the fulcrum of the pair of lever arms is located behind the feed roll and the swingable ends of the pair of lever arms are bent in a substantial horizontal direction.

22. A machine as claimed in clam 21, wherein the fulcrum of the pair of lever arms is located behind and below the feed roll.

References Cited

UNITED STATES PATENTS

| 2,522,728 | 9/1950 | Townsend | 146—130 |
| 2,590,747 | 3/1952 | Birdseye | 146—130 |
| 3,215,179 | 11/1965 | Schill | 146—130 |

FOREIGN PATENTS

| 376,216 | 5/1964 | Switzerland. |

W. GRAYDON ABERCROMBIE, *Primary Examiner.*